United States Patent [19]

Ford et al.

[11] Patent Number: 4,793,932
[45] Date of Patent: Dec. 27, 1988

[54] VARIABLE VOLUME FILTER OR CONCENTRATOR

[75] Inventors: Douglas L. Ford, Eastwood; Clinton V. Kopp, Castle Hill, both of Australia

[73] Assignee: Memtec Limited, New South Wales, Australia

[21] Appl. No.: 10,089
[22] PCT Filed: Apr. 4, 1986
[86] PCT No.: PCT/AU86/00085
 § 371 Date: Dec. 5, 1986
 § 102(e) Date: Dec. 5, 1986
[87] PCT Pub. No.: WO86/05997
 PCT Pub. Date: Oct. 23, 1986

[30] Foreign Application Priority Data
Apr. 10, 1985 [AU] Australia .................................. 0081
Nov. 11, 1985 [AU] Australia .................................. 3356

[51] Int. Cl.⁴ .......................................... B01D 13/01
[52] U.S. Cl. .................................... 210/636; 210/637;
 210/651; 210/798; 210/324; 210/351; 210/412;
 210/414; 210/433.2; 210/321.8
[58] Field of Search ............... 210/636, 637, 650, 651,
 210/797, 798, 321.1, 349, 350, 351, 411, 412,
 414, 433.2, 456

[56] References Cited
U.S. PATENT DOCUMENTS

| | | | |
|---|---|---|---|
| 3,442,002 | 5/1969 | Geary, Jr. et al. | 210/321.1 X |
| 3,912,624 | 10/1975 | Jennings | 210/433 X |
| 3,992,301 | 11/1976 | Shippey et al. | 210/433 X |
| 4,629,568 | 12/1986 | Ellis | 210/636 |

FOREIGN PATENT DOCUMENTS

| | | |
|---|---|---|
| 2267138 | 6/1975 | France . |
| 53-108882 | 9/1978 | Japan . |
| 60-32897 | 2/1985 | Japan . |
| 60-22906 | 2/1985 | Japan . |
| 60-44088 | 3/1985 | Japan . |
| 1398284 | 7/1975 | United Kingdom . |
| 1535832 | 12/1978 | United Kingdom . |

OTHER PUBLICATIONS

"The Chemical Engineer" *Development Studies of Crossflow Microfiltration,* by R. Bertera et al., pp. 10–14, Jun., 1984.
WO 85/01449, Apr. 11, 1985, Douglas Ford, "Cleaning of Filters".

*Primary Examiner*—Frank Sever
*Attorney, Agent, or Firm*—Oblon, Fisher, Spivak, McClelland & Maier

[57] ABSTRACT

A concentrator for concentrating the fine solids of a liquid feed suspension has a shell within which there is a bundle of microporous fibers. Pressurized feed suspension is introduced through an inlet and passes over the external walls of the fibers with the clarified liquid being drawn from the lumens of the fibers and the concentrated feed being discharged through an outlet. The solids retained within the shell are removed by first applying a pressurized liquid and then applying a gas at a pressure sufficient to ensure that the gas will pass through the larger pores of the fibrs to remove the solids from the shell through the outlet to an external collection point. The fibers are enclosed within a variable volume diaphragm located within a diaphragm holder by spaced plugs. The volume of the diaphragm is altered by varying the pressure of a fluid introduced through the inlet to the space between the diaphragm and the diaphragm holder.

15 Claims, 2 Drawing Sheets

VARIABLE VOLUME FILTER OR CONCENTRATOR

FIELD OF THE INVENTION

This invention relates to a variable volume filter or concentrator containing a bundle of porous hollow fibers.

For the sake of convenience, the invention will be described in relation to the use of hollow fibers in the recovery of fine solids from suspensions. However, it is to be understood that the invention is not limited thereto as it may be readily applied to cross-flow filters and other devices using bundles of porous hollow fibers.

The problem of recovery of fine solids from suspensions is complementary to that of recovering clear liquids from suspensions.

The producers of clear liquids usually regard all visible traces of solids as wastes. The methods used often involve the addition of flocculants and filter aids which contaminate the solids. The solids content tends to be low, encouraging the use of methods which remove clear liquid from a continuously fed feed suspension tank in which the solids content increases until some deleterious effect arises, necessitating the dumping of the contents of the feed suspension tank into some other device. Invariably, the accumulating solids have been steadily slowing production and productivity could benefit from some device which continuously rejected concentrated solids.

In contrast thereto, the producers of finely divided solids are usually the food, mining or manufacturing industries for which the solids are desired and the liquid is best recycled. Also, the solids have specifications for size and purity, often need further processing and mostly need to be obtained at high solids content as concentrates. Filter aids will, of course, contaminate the product.

A detailed recent discussion of cross-filtration is given by R. Bertera, H. Steven and M. Metcalfe, *The Chemical Engineer,* pp. 10–14, June, 1984.

As shown in FIG. 8 of the above publication even the latest 1984 commercial Enka Membrana A.G. filter module rapidly fouled and the clarified liquid flux continued to decline when backwashed with transmembrane clarified liquid in the constant concentration cross-flow (diafiltration) mode on a fine inorganic filler.

Economically, the ability to cope with strongly fouling solids without filter aids is most pressing. This fouling problem has long been recognized and the art records some attempts to substitute gas for clarified liquid during backwashing to avoid the recycle of clarified liquid to the feed suspension. Thus, Japanese unexamined Patent Kokai Publication No. 53(1978)-108,882 states:

"Since the filtrate is not used in the present invention for membrane reverse cleaning, the serious defect of the prior art method, that is, returning the filtrate substantially to the crude liquid, is eliminated, with obvious industrial merits."

Transmembrane gas backwashing is impossible in very finely pored filters such as reverse osmosis membranes and ultrafilters because the pressures needed to overcome surface tension are far beyond the strengths of normal hollow fiber membranes used for these purposes; wetting liquids may pass but not gases. Any gas bubbles passing through such a membrane indicate the presence of pin hole defects in the membrane. Hence, this invention has no application to reverse osmosis or to true ultrafilters.

This invention is concerned with microfilters which contain larger pores than those of ultrafilters and which range from 0.01 to 10 microns. Usually, the larger of the pores are so distributed that clarified liquids are free of all visible turbidity. Turbidity of the clarified liquid involves more than pore and particle size, obeying and arising from well known optical laws.

Early microfilters fouled quickly since they treated particles which were not suspended by Brownian motion nor diffusion but which penetrated into pores of a similar size range as the particles in the manner of sieve blinding.

One approach to solving this problem was to operate hydrophilic microfilters in a cross-flow mode with clarified liquid transmembrane backwash. High cross-flow velocities required feed suspension to be directed to the smaller filtering surface of the lumen as opposed to the larger external surface of the fiber. Thus, backwash pressures had to be limited to avoid fiber crushing. The smaller filtering surface reduced output and this approach was frequently not a useful solution to the fouling problem.

In Japanese Patent Kokai Publication No. 53(1978) 108,882 mentioned above a hollow fiber bundle in loose "candle" configuration of hydrophilic "polyvinyl alcohol PVA)" fibers was made to writhe during long (one minute) lumenal reverse flows with air. Filter "candles" are more akin to dead-end filters than to cross-flow shell and tube filters in that they are in the form of elongated hollow pots closed at one end.

Co-pending International patent applications PCT/AU86/00049 corresponding to U.S. application Ser. No. 939,121 Concentration of Solids in a Suspension and PCT/AU86/00080 Cooling Hollow Fibre Cross-Flow Separators disclose improved methods for concentrating and isolating the solids from a liquid suspension in minimal time.

In broad terms, these two specifications are directed to a method of concentrating the solids of a liquid suspension which comprises the steps of:

(i) applying the liquid suspension to the outer surface of elastic, microporous, hollow fibers within a shell or housing whereby:

(a) some of the liquid suspension passes through the walls of the fibers to be drawn off as clarified liquid from the fiber lumens, (b) at least some of the solids are retained on or in the fibers or otherwise within the shell with the non-retained solids being removed from the shell with the remainder of the liquid, (ii) discharging the retained solids from the shell by applying through the fiber lumens:

(a) a pressurized liquid which passes through substantially all of the pores whereby substantially all of the pores are stretched to wash out any retained solids followed by, (b) a pressurized gas which passes through the larger pores to stretch those pores to dislodge any solids retained in those pores and to wash the external walls of the fibers and the interior of the shell to remove all solids from the shell to an external collection point.

However, the above inventions can be improved by attention to the volume of the shell which encloses the porous hollow fiber filter bundle.

During normal cross-flow operation, there is a need to eliminate dead spots and to secure a uniform, fast stream of suspension along the length of the fibers. A relatively tight shell is needed to achieve the same.

However, the shell should not be of unvarying diameter. As filtration progresses in a common recycle concentration mode wherein clarified liquid and concentrated solids are both rejected as rapidly as possible, the solids content of the feed suspension rises steeply. It is then desired to expand the shell to maintain a constant pressure drop along the length of the fibers. The start of each new batch needs a contraction in the shell diameter. On the other hand, at each combined permeate/gas ejection of solids, it is desired to expand the shell to facilitate discharge and interfiber cleaning.

The lining of the shell with an elastic or heat shrinkable liner is diclosed in French Pat. No. 2,267,138. However, the purpose of that liner is to facilitate construction of a tight sleeve over the porous hollow fiber bundles. This achieves the elimination of dead spots and secures a uniform feed and pressure drop in the shell only while the feed is unchanging. Also there was no provision for solids discharge nor even for backwashing. A comprehensive review of the art to that data is included in that French patent.

Furthermore, the prior art does not recognize the value of an elastic sleeve whose elasticity is adjusted or is made adjustable by a back-pressure or tensioning so that a pulsed feed supply can cause controlled rubbing between the fibers and between the fibers and elastic sleeve without fiber tangling. Such controlled rubbing gives extra control of the thickness of any filter cake thus allowing reduction of high feed recycle formerly used as a sole means of control.

Accordingly, French Pat. No. 2,267,138 does not address the vital need in cross-flow filtration for a shell which varies in diameter during a run and must often expand every minute to allow solids to discharge.

DISCLOSURE OF THE INVENTION

According to the present invention there is provided an apparatus for treating a liquid suspension comprising a shell, a plurality of elastic, hollow, microporous fibers within the shell, means for supplying pressurized feed suspension to the shell, means for withdrawing clarified liquid from the shell, means for applying a pressurized reverse flow or backwash of clarified liquid followed by a pressurized reverse flow or backward of gas to discharge solids retained on or in the fibers or otherwise within the shell, means for discharging concentrated suspension, and a variable volume elongated diaphragm within the shell.

Preferably, the pressurized gas is so applied as to backwash the full length of the fibers by displacing any lumen liquid with gas at a pressure below the bubble point of the walls of the fibers. The shell is then sealed with the relatively incompressible feed liquid so that gas cannot flow through the fiber walls as the pressure of the trapped gas is raised beyond the bubble point. The liquid seal is then released to allow the trapped gas to escape substantially uniformly through the fiber walls even at the most distant point from the lumen inlet thus minimizing subsequent preferential washing of pores near the gas inlet.

In one form of the invention, the concentrator includes means for sealing the relatively incompressible feed suspension in the shell upon displacement of liquid from the fiber lumens by the pressurized gas so that the gas may be trapped in the lumens at a pressure above the bubble point of the fiber walls and means to allow the sudden release of the gas substantially uniformly through the fiber walls.

The diameter of the diaphragm is adapted to change according to a preset schedule or is adapted to change to maintain a controllable pressure drop along the shell. The pressure drop is substantially independent of feed viscosity. The diameter may also increase to facilitate periodic discharge of accumulated solids on or between the hollow fibers.

The invention also provides a method of:

(a) initially applying the gas at a pressure below the bubble point of the walls of the fibers so as to displace any liquid from the fiber lumens, (b) sealing the shell and the external surfaces of the fibers with a liquid, (c) increasing the pressure of the gas above the bubble point of the walls of the fibers, and (d) releasing the liquid seal to allow the trapped gas to escape substantially uniformly through the fiber walls.

BRIEF DESCRIPTION OF THE DRAWINGS

In order that the invention may be more readily understood and put into practical effect, reference will now be made to the accompanying drawings in which.

DESCRIPTION OF PREFERRED EMBODIMENTS

Figure 1:
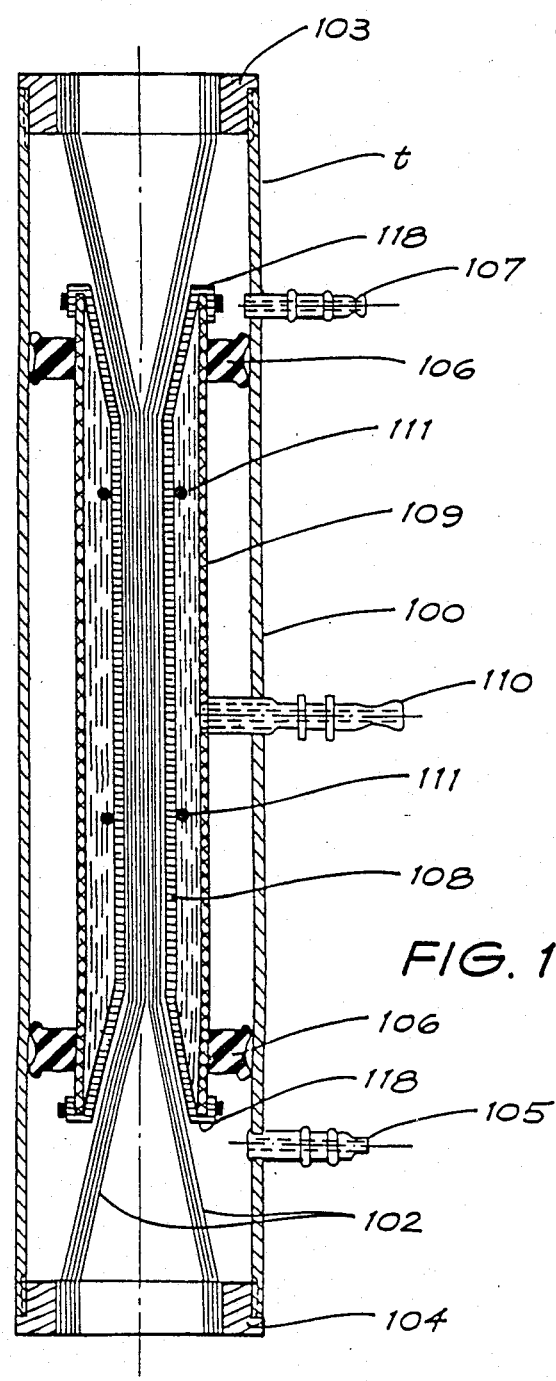
FIG. 1 is a simplified schematic diagram of a hollow fiber cross-flow concentrator according to one embodiment of the invention, and, FIG. 2 is a schematic diagram of a hollow fiber cross-flow concentrator system incorporating the concentrator of FIG. 1.

The hollow fiber concentrator shown in FIG. 1 includes a shell 100 within which is positioned a bundle of hollow, porous, polymeric fibers 102. In this instance, each fiber is made of polypropylene, has an average pore size of 0.2 micron, a wall thickness of 200 micron and a lumen diameter of 200 micron. There are 3000 hollow fibers in the bundle 102 but this number as well as individual fiber dimensions may be varied according to operational requirements.

Sealing plugs 103 and 104 hold the ends of the fibers 102 in place without blocking their lumens and close off each end of the shell 100. Liquid feed suspension to be concentrated is pumped into the shell 100 through feed suspension inlet 105 and passes over the external walls of the fibers 102. Some of the feed suspension passes through the walls of the fibers into the lumens of the fibers to be drawn off as clarified liquid through the shell outlets formed in the sealing plugs 103 and 104.

The remaining feed suspension and some of the rejected solids flow between the fibers 102 and leave the shell 100 through outlet 107. The remainder of the rejected solids is held onto or within the fibers or is otherwise retained within the shell.

The bundle of fibers 102 is positioned within a deformable tubular diaphragm 108 the ends 118 of which are secured over and to the upper and lower extremities of a diaphragm holder tube 109 held in position by sealing plugs 106.

In operation, feed suspension enters the shell 100 through inlet 105 at pressure P1 and impinges upon the rigid diaphragm holder tube 109 before entering the fiber bundle.

The fiber bundle is confined by the deformable diaphragm sleeve 108 and the position of the diaphragm 108 is set by fluid entering the diaphragm control pressure inlet 110 at a pressure P3. Raising the pressure P3 forces the diaphragm 108 tightly onto the hollow fiber bundle whilst reducing the pressure enough ultimately allows the diaphragm 108 to lie fully against the diaphragm holder tube 109.

If desired, the thickness of elasticity or internal ducting of the diaphragm 108 can be selected to give any desired pressure drop configuration along the length of the fibers. Elastic bands 11 which are a simple choice to achieve this are indicated in FIG. 1 but they are by no means necessary.

Figure 2:
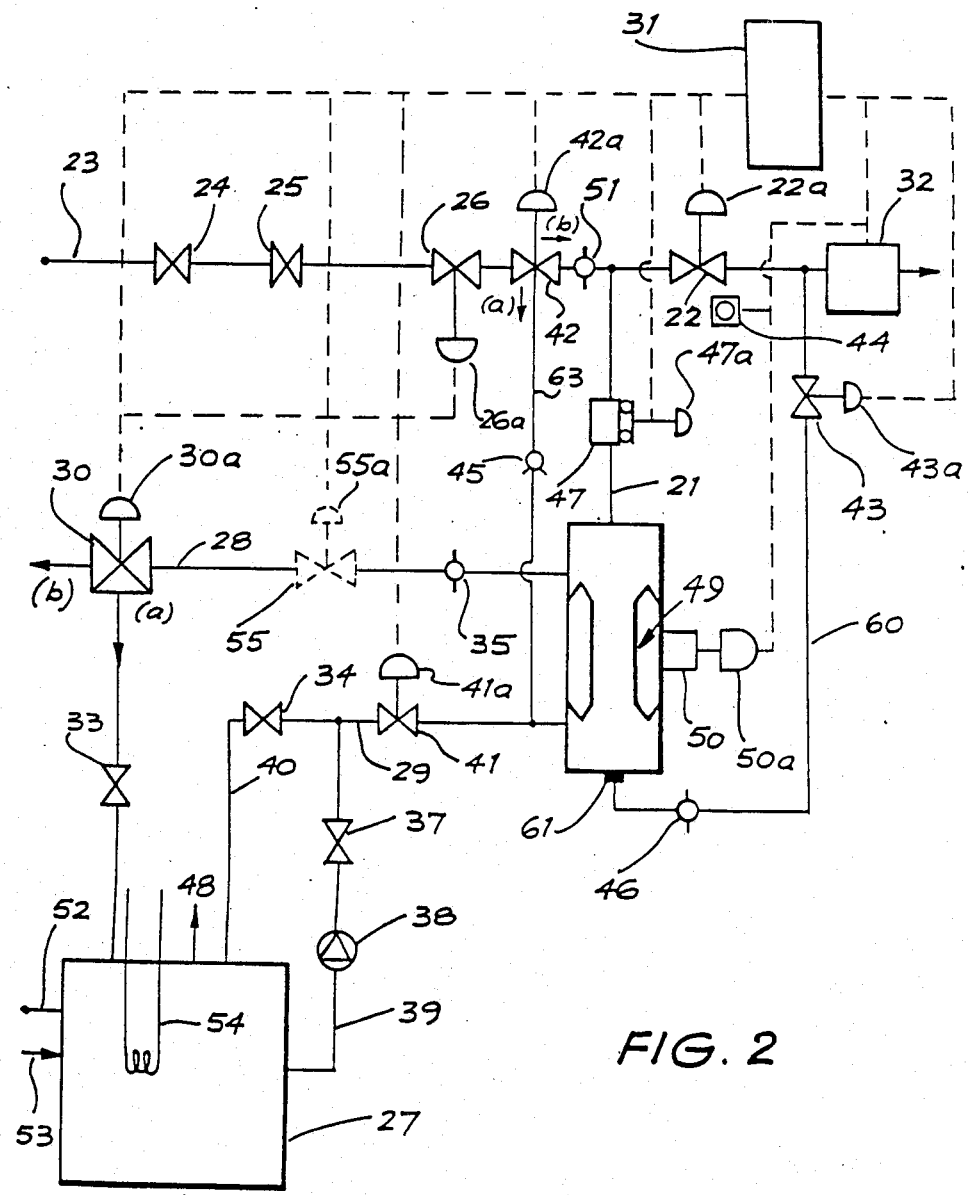

The variable volume tubular diaphragm of the invention can be applied to a cross-flow hollow fiber concentrator system of the kind shown in FIG. 2 which operates in a number of modes. The system of FIG. 2 will be first described without reference to the diaphragm. In the cross-flow concentration mode, the pump 38 draws feed suspension from the feed suspension tank 27 through pump suction line 39 thence through inlet pressure valve 37 and delivers it through feed suspension inlet line 29 (having a feed suspension stop solenoid valve 41) to the cross-flow concentrator 20.

Feed suspension passes over the surface of the hollow fibers inside the cross-flow concentrator 20 and some of the fluid passes through the fibers into the lumens to be delivered to the clarified liquid outlet line 21. The clarified liquid in line 21 passes through clarified liquid hold-up cylinder 47 which is operated by solenoid 47a, clarified liquid control valve 22 controlled by solenoid 22a and flow sensor 32 to a clarified liquid collection point. Flow of clarified liquid to line 23 is prevented by check valve 51.

Concentrated feed suspension from the cross-flow concentrator 20 passes through the check valve 35 and the solenoid-operated shell sealing valve 55 (when fitted) into line 28 from which it is delivered to the three way concentrate divert valve 30 controlled by solenoid 30a. The valve 30 has outlet paths (a) and (b) which lead to the feed suspension tank 27 and to a concentrate collection point respectively. In the concentration mode, the valve 30 is in position (a) so that the concentrated feed suspension passes through back pressure valve 33 into the tank 27.

A bypass valve 34 in bypass line 40 is set to control, together with the inlet pressure valve 37, the flow rate through the cross-flow concentrator 20. The feed suspension tank 27 has a feed suspension inlet 53 and a washing inlet 52, heater 54 and vent 48.

The suspension inlet pressure, the concentrated suspension outlet pressure and the clarified liquid pressure are controlled or set by said valves 37, 33 and 22 respectively. During the concentration mode gas stop valve 26 is closed, valve 55 opened and valve 30 is set to path (a).

The liquor issuing from valve 22 is monitored by flow sensor 32 and the parameters sensed are used as inputs to the programmable controller 31. The controller 31 compares the actual flow rate of the clarified liquid with preset values of flow rate and time to initiate a discharge cycle.

In this instance, there are two criteria for determining the appropriate time to discharge the concentrator 20. The first criterion is the clarified liquid discharge flow rate and once it decreases to a predetermined and set rate the controller 31 initiates a discharge cycle. The second criterion is time where the controller initiates a discharge cycle at fixed time intervals. The second criterion is more appropriate for feed suspensions where the liquor flow rate does not decline very rapidly.

Substantially dry gas is introduced to the system during the discharge mode through line 23 which includes a gas pressure control valve 24, a gas flow valve 25 and a gas stop valve 26 controlled by solenoid 26a. In order to allow evporation (and hence cooling), the gas must be unsaturated with respect to the liquid vapour at the operating temperature.

A lumenal cooling discharge line 60 connected between the lumenal air outlet 61 and clarified liquid outlet line 62 contains a lumenal cooling stop valve 43 which is controlled by solenoid 43a and a lumenal cooling check valve 46. A shell cooling line 63 connected between the feed inlet line 29 and the shell cooling divert valve 42 in line 23 has a shell cooling check valve 45. The shell cooling divert valve 42 is controlled by solenoid 42a and has inlet paths (a) and (b) the functions of which will be described below.

To effect a discharge, the programmable controller 31 sets the system to discharge mode by actuating solenoids 22a, 26a, 43a and 30a which in turn close valve 22, open valve 26, close valve 43 and change the outlet path of the three way concentrate divert valve 30 to path (b) so that the subsequent variable volume clarified liquid hold up and the gaseous discharge medium as well as the material dislodged from the fibers can be discharged from the system.

If the temperature sensed by sensor 44 is higher than the preset limit and the other conditions necessitate a reverse flow cleaning cycle, the programmable controller initiates a lumenal flow through of gas for rapid evaporative cooling of the hollow fibers prior to reverse flow cleaning by actuating solenoids 22a, 43a, 41a and 26a so that valve 22 is closed, valve 43 is open, valve 41 is closed and valve 26 is open for a predetermined time, termed the lumenal cool time. The lumenal cooling gas flows through line 21 without disturbing the clarified liquid in the hold-up cylinder 47 and is discharged into the clarified liquid line through valve 43. The lumenal cooling time is sufficient to reduce the temperature of the fibers to within safe limits.

Although the gas will cool a fiber which is saturated with a non-volatile liquid by withdrawing heat equal to the product of the mass and the specific heat of the gas and the temperaure difference, such cooling is slow and this invention is most effective when applied to liquids of substantial volatility and latent heat of evaporation. Water is ideal because of its large latent heat of evaporation. Times of 5 to 20 seconds are normal for cooling water so that there is very little loss of productive time compared to the hours saved per day by operating at the higher temperatures and better washing is thus made possible. There is little added expense since most of the expensive equipment already exists for other purposes.

The solids discharge is then initiated by the programmable controller 31 which actuates solenoid 26a to open gas valve 26 and the solenoid 47a of clarified liquid hold up cylinder 47 so that the liquid content of that device is discharged under pressure from gas supplied through valve 26 into the lumens and across the fibers in the reverse direction to normal operation so as to expand all the pores and to displace all the liquid in any solids lodged within the pores of the fibers.

After the hold-up cylinder 47 has been emptied, programmable controller 31 continues gas flow through valve 26 and line 21 into the lumens and through the larger pores of the fibers to wash solids off the fibers and the interior of the shell. Valve 26 is closed by solenoid 26a at the end of the gas discharge time.

To achieve more uniform gas discharge through the larger pores along the full length of a narrow fiber, it is preferred to vent the gas, after hold-up cylinder 47 has been emptied, through the lumen check valve 46 and lumenal stop valve 43 (which has been opened by programmable controller 31 actuating solenoid 43a). The controller 31 then closes shell sealing valve 55 by actuating solenoid 55a and feed stop valve 41 by actuating solenoid 41a so that gas pressure builds up within the shell 27 to the full pressure set by the gas pressure regulator 24. Shell sealing valve 55 is then opened for the predetermined gas discharge time by the controller 31 actuating solenoid 55a.

At the end of the discharge cycle time, programmable controller 31 returns the system to the concentration mode as described above, except that valve 22 is kept closed until the hold-up cylinder 47 is filled with clarified liquid.

For the processing of some feed suspensions it may be desirable to cool the fibers by passing the gas through the shell side of the fibers. When the temperature sensed by sensor 44 is higher than the preset limit and the other conditions necessitate a reverse flow cleaning cycle, the programmable controller initiates a shell-side cooling cycle by actuating valve 41 (closed), 26 (open), and 42 (to position a) for a preset time, termed the shell-side cooling time, which is sufficient to reduce the temperature of the fibers to an optimal safe level. At the completion of the shell-side cooling time the programmable controller 31 initiates a reverse flow cleaning cycle by actuating valves 22 (closed), 42 (to position b) for the reverse flow cycle time. At the completion of the reverse flow cleaning cycle the programmable controller 31 returns the system to the concentration mode as described above.

In accordance with the present invention, the system so far described is improved by the provision of the diaphragm shown in FIG. 1. The deformable variable diameter diaphragm 49 shown schematically in FIG. 2 is controlled in position by the solenoid valve 50. Solenoid valve 50 is controlled by the programmable controller 31 to given any desired sequence of diaphragm positions.

In particular, the diaphragm is expanded whenever the solids ejection cycle begins and is not contracted until feed suspension flow is recommenced. The control of the contraction during the filtration phase may be by a schedule determined by experiments on the feed. Or simply, the position may be controlled in most circumstances by the pressure drop between the suspension inlet line 29 and the suspension outlet line 28. A very flexible diaphragm adjusts along its length for volume and viscosity changes occurring along the length of the shell.

The invention will be further described in relation to the following examples.

EXAMPLE 1

A filter was constructed as shown in FIG. 1. It was 50 cm long and contained 500 polypropylene hollow fibers of 200 micron bore and 200 micron walls. The original average pore diameter was 0.2 micron but the pore walls were coated with a hydrophilic nylon according to co-pending Australian patent application No. PG 1368 Treatment of Porous Membranes.

With the variable diameter diaphragm wide open there was a clear path around the fiber bundle of 1 cm all round. When whole egg was applied at 100 kPa, the rate of permeation dropped in 3 minutes from 20 L/sq.m./hour to below 1 L/sq.m./hr. After cleaning with water and concentrated hydrochloric acid, then water again, the experiment was repeated with the diaphragm tightly fitting the fibers. The rate of permeation stabilized at 20 L/sq.m./hr. This rate fell in 10 minutes to 12 L/sq.m./hr. but could be recovered to 20 L/sq.m./hr. by backwashing through the pores at 700 kPa with a pore stretching volume of permeate followed by air at 700 kPa to clear the surface and shell of mucin.

The experiment proved the need of controlling the velocity of the feed along the fibers and that only a tight fitting diaphragm would give this result. However, the gas reverse flow through the larger pores widened the membrane as noted by the pressure rise in the control pressure P3. A test of the desirability of such variable diameter was then made in example 2.

EXAMPLE 2

The apparatus of FIG. 1 was modified by replacing the variable diameter diaphragm with a rigid sleeve. The permeation rate of whole egg was again 20 L./sq.m./hr. However when attempts were made to blow back by reverse direction of gas through the pores no cleaning occurred.

It was concluded that the diaphragm diameter must be increased to allow the expanding air to sweep the surfaces.

EXAMPLE 3

The apparatus of Example 2 without the valve 55 was used to separate clear water from an emulsion of 0.1% BP FEDARO-M emulsifiable oil in water. After standing 8 hours it was found that the oil had swollen the polypropylene fibers 10% in all dimensions. Loops of fiber were forced along with the feed and hung out of the exit end of the confining rigid sleeve. They could not be forced back by reversing the flow.

However, when the experiment was repeated with the apparatus of FIG. 1 it was found possible to regulate the diaphragm pressure to allow for the fiber swell. When excessive rates did push the fibers out of the sleeves, they could be returned by opening the sleeve and reversing the flow. There is a need for maintaining the desired flow rate of feed along the fibers as defined by the Reynolds number or any equivalent engineering dimensionless number related to turbulence of flow. There is also a need to be able to expand and recontract the diaphragm at each air backwash through the pores.

EXAMPLE 4

A crude cane sugar juice was put through the apparatus of FIG. 2 without valve 55 and without the flexible diaphragm and it quickly blocked with fine fibrous material which could not be dislodged by the air backwash through the larger pores.

However when the variable diaphragm was used, it was found that small paper-like aggregates of the fiber could be blown out when the diaphragm was wide open. This is commercially very useful since it eliminates the need for fine 5-10 micron pre-filters.

EXAMPLE 5

Example 4 was repeated but the feed was a mixed suspension of precipitated chalk and aluminium hydroxide. Lumps of chalk accumulated in the fiber bundle and could only be removed by opening the diaphragm fully.

The elasticity of the elastic sleeve may be adjusted by a back-pressure or tensioning so that a pulsed feed supply can cause controlled rubbing between the fibers and between the fibers and the elastic sleeve to assist greatly the removal of filter cake. Pulsing may be achieved by altering the flow rate of the feed suspension as it enters the shell, by varying the pressure at diaphragm control inlet 110 or by piercing the sleeve at or near its top to give controlled communications between diaphragm control inlet 110 and oulet 107 and then varying the pressure at inlet 105.

Various modifications may be made to the diaphragm of the shell without departing from the scope and ambit of the invention as described above.

We claim:

1. Appratus for treating a liquid suspension and concentrating the solids of said liquid suspension, comprising: a shell, a plurality of elastic, hollow, microporous fibers within the shell, means communicated with said shell for supplying pressurized feed suspension to the shell, means communicated with said shell for withdrawing clarified liquid from the shell, means communicated with said shell for applying a pressurized reverse flow of gas to discharge solids retained on or in the fibers or otherwise within the shell, means communicated with said shell for discharging said solids, a variable volume elongated diaphragm positioned within the shell and enclosing the plurality of fibers, and means for varying the volume of said diaphragm.

2. Apparatus according to claim 1 and further including a diaphragm holder mounted within the shell by means of spaced apart annular plugs positioned between the exterior of the holder and the interior of the shell and wherein the ends of the diaphragm are secured to the ends of the holder.

3. Apparatus according to claim 2 and further including means for admitting fluid between the diaphragm and the holder, and means for controlling the pressure of the fluid.

4. Apparatus according to claim 3 wherein the pressure control means comprising means for controlling the fluid pressure in accordance with a pre-determined schedule.

5. Apparatus according to claim 3 wherein the pressure control means comprising means for controlling the fluid pressure in response to changes in the pressures of the feed and of a concentrated feed.

6. Apparatus according to claim 1 and further including means for sealing the liquid feed suspension in the shell upon displacement of liquid from the fiber lumens by the pressurized gas so that the gas may be trapped in the lumens at a pressure above the bubble point of the fiber walls and means to allow the sudden release of the gas substantially uniformly through the fiber walls.

7. A method of concentrating the solids of a liquid suspension, comprising the steps of:
  (i) applying the liquid suspension to the outer surface of elastic, microporous, hollow fibers enclosed by a deformable, variable volume diaphragm within a shell to concentrate said solids by
    (a) passing some of the liquid suspension through the walls of the fibers to be drawn off as clarified liquid from the fiber lumens,
    (b) retaining at least some of the solids on or in the fibers or otherwise within the shell with the non-retained solids being removed from the shell with the remainder of liquid,
  (ii) discharging the retained solids from the shell by:
    (a) applying to the fiber lumens a gas at a pressure sufficient to stretch all of the pores, followed by:
    (b) maintaining the flow of the gas at said pressure through the lumens for a time sufficient to drive the liquid from the pores having a bubble point below the pressure of the gas so as to wash out any solids retained in those pores and to subtantially dislodge solids retained on the outer surface of the fibers so that the washed and dislodged solids are removed from the shell to an external collection point, and then,
    (c) reducing the pressure of the gas so that the pores will substantially return to their original size whereupon the gas is removed so that a portion of the liquid suspension passes through the walls of the fiber to be drawn off as clarifying liquid from the fiber lumens; and
  (iii) varying the volume of the diaphragm so as to provide a reduced but variable volume during the application of the liquid suspension and a larger volume whilst the pressurized gas is applied.

8. A method according to claim 7 wherein the application of the pressurized gas includes the steps of:
  (a) initially applying the gas at a pressure below the bubble point of the walls of the fibers so as to displace any liquid from the fiber lumens,
  (b) sealing the shell and the external surfaces of the fibers with a liquid,
  (c) increasing the pressure of the gas above the bubble point of the walls of the fibers, and,
  (d) releasing the liquid seal to allow the trapped gas to escape substantially uniformly through the fiber walls.

9. A method according to claim 1 or claim 8 wherein the steps of the method are carried out as a continuous process utilizing repetitive cycles of solids retention and solids discharge.

10. A method according to claim 9 which comprises delaying the resumption of the flow of feed suspension through the fibers after the solids discharging steps for sufficient time to allow the expanded pores to recover to their original size so that over-sized particles from the feed suspension will not be able to pass into or through the enlarged pores.

11. A method according to claim 10 which comprises delaying the resumption of the flow of feed suspension by applying the gas a pressure higher than that of the feed suspension and allowing the pressure of the gas to fall below the feed pressure at a rate which will allow the pores of the fibers to recover to their original size before the flow of feed is resumed.

12. A method according to claim 1 which comprises controlling the flow of treated feed suspension from the shell by valve means so as to apply a back pressure to the feed.

13. A method according to claim 1 wherein the liquid providing the sealing of the shell is the feed liquid.

14. A method according to claim 1 which comprises changing the volume of the diaphragm in accordance with a preset schedule.

15. A method according to claim 1 which comprises changing the volume of the diaphragm so as to maintain a controlled pressure drop along the shell.

* * * * *